(12) United States Patent
Jeon et al.

(10) Patent No.: US 10,067,385 B2
(45) Date of Patent: Sep. 4, 2018

(54) DISPLAY DEVICE

(71) Applicant: SAMSUNG ELECTRONICS CO., LTD., Suwon-si (KR)

(72) Inventors: Jong Pil Jeon, Goyang-si (KR); Suk-Ju Choi, Jeonju-si (KR); Jong-Hoi Kim, Suwon-si (KR); Yong-Hun Kwon, Anyang-si (KR); Kun Ho Cho, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 107 days.

(21) Appl. No.: 15/079,746

(22) Filed: Mar. 24, 2016

(65) Prior Publication Data

US 2016/0282670 A1    Sep. 29, 2016

(30) Foreign Application Priority Data

Mar. 24, 2015  (KR) .................. 10-2015-0040654

(51) Int. Cl.
*G09F 13/04* (2006.01)
*G02F 1/1335* (2006.01)

(52) U.S. Cl.
CPC .. *G02F 1/133611* (2013.01); *G02F 1/133603* (2013.01); *G02F 1/133608* (2013.01); *G02F 2001/133612* (2013.01); *G02F 2001/133613* (2013.01)

(58) Field of Classification Search
CPC ......... G02F 1/133611; G02F 1/133603; G02F 1/133608; G02F 2001/133613; G02F 2001/133612
See application file for complete search history.

(56) References Cited

U.S. PATENT DOCUMENTS

2009/0168401 A1   7/2009  Kwon et al.
2009/0316386 A1*  12/2009  Yun .................. G02F 1/133603
                                            362/97.1

(Continued)

FOREIGN PATENT DOCUMENTS

EP       2455652 A1    5/2012
JP       2008-181750 A  8/2008
KR    10-2007-0002144 A  1/2007

(Continued)

OTHER PUBLICATIONS

Communication dated Oct. 17, 2016, issued by the European Patent Office in counterpart European Patent Application No. 16159730.7.

(Continued)

*Primary Examiner* — Evan Dzierzynski
(74) *Attorney, Agent, or Firm* — Sughrue Mion, PLLC

(57) ABSTRACT

A display device having a structure capable of improving brightness "Mura" and color "Mura" that may be generated in a direct type backlight unit has a structure in which a plurality of light sources are arranged in a pattern similar to a square arrangement along the edges of the backlight unit, and in a pattern similar to a triangle arrangement within an intermediate region of the backlight unit, and a connector for connecting a cable disposed on a Printed Circuit Board (PCB) is disposed on the rear side of the PCB such that the connector does not influence "Mura" of the backlight unit.

9 Claims, 16 Drawing Sheets

(56) References Cited

U.S. PATENT DOCUMENTS

2012/0139445 A1\* 6/2012 Fujiwara ........... G02F 1/133603
                                                      315/294
2013/0027968 A1\* 1/2013 Urano .................. G02B 6/0068
                                                      362/602

FOREIGN PATENT DOCUMENTS

| KR | 10-2007-0069499 A | 7/2007 |
| KR | 10-2007-0107227 A | 11/2007 |
| KR | 10-2010-0080024 A | 7/2010 |
| KR | 10-2012-0110284 A | 10/2012 |

OTHER PUBLICATIONS

Communication dated Jul. 13, 2016, issued by the European Patent Office in counterpart European Patent Application No. 16159730.7.

\* cited by examiner

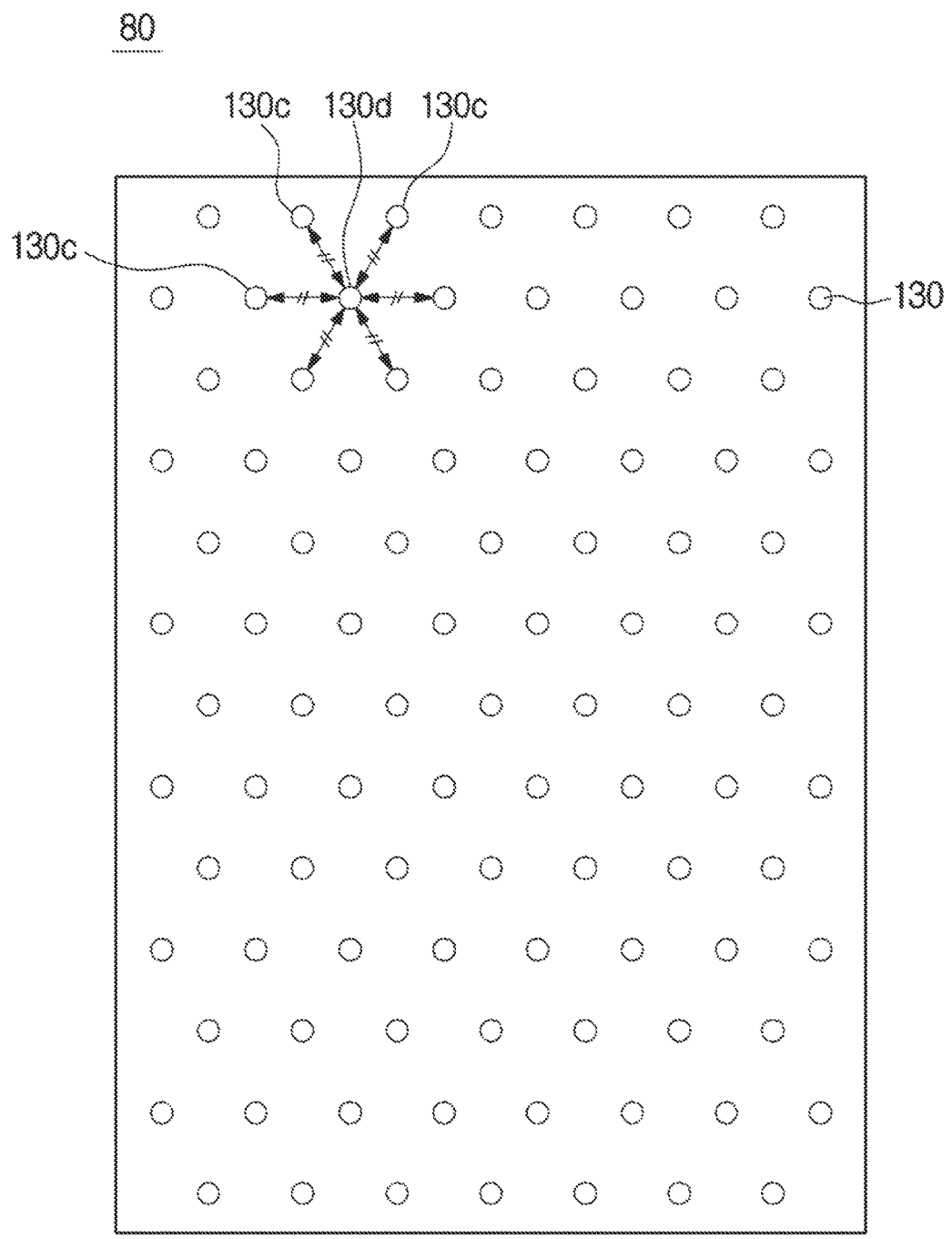

DISPLAY DEVICE

CROSS-REFERENCE TO RELATED APPLICATIONS

This application claims the benefit of Korean Patent Application No. 10-2015-0040654, filed on Mar. 24, 2015, in the Korean Intellectual Property Office, the disclosure of which is incorporated herein by reference in its entirety.

BACKGROUND

1. Field

Exemplary embodiments of the present disclosure relate to a display device, and more particularly, to a display device having an improved backlight unit.

2. Description of the Related Art

A display device is a kind of output apparatus that converts electrical information into visual information to display the visual information for users. Examples of display devices include a television, a monitor, and various kinds of portable terminals (for example, a smart phone, a tablet and the like).

Some display devices include a Cathode Ray Tube (CRT) display, a Light Emitting Diode (LED) display, an Organic Light Emitting Diode (OLED) display, an Active-Matrix Organic Light Emitting Diode (AMOLED) display, a Liquid Crystal Display (LCD), and an Electronic Paper Display (EPD).

Since the LCD is light in weight and thin in size and has relatively low power consumption, it is widely used in various applications, such as a television, a monitor, a portable display, and the like.

The LCD may include a display panel and a backlight unit to supply light to the display panel. Since the LCD displays information in the form of images using light passed through the display panel, the quality of images that are displayed on the LCD is greatly influenced by the brightness of light and brightness uniformity of the light provided from the backlight unit.

Some LCDs use a side type backlight unit including a Cold Cathode Fluorescent Lamp (CCFL) disposed along the side(s) of a display panel and a light guide plate. However, recently, some LCDs have adopted a direct type backlight unit configured by disposing, behind a display panel, a light source module in which LEDs having low power consumption and high brightness properties are arranged on a Printed Circuit Board (PCB).

However, in the direct type backlight unit, particularly, in a direct type backlight unit including white or blue LEDs, brightness "Mura" due to non-uniform brightness distribution and color "Mura" due to non-uniformity of color contrast may be generated.

SUMMARY

It is an aspect of the present disclosure to provide a display device having a structure capable of improving brightness "Mura" and color "Mura" that may be generated in a direct type backlight unit.

It is another aspect of the present disclosure to provide a display device having an improved structure such that a connector configured to connect a cable disposed on a PCB of a backlight unit does not influence "Mura" of the backlight unit.

Additional aspects of the disclosure will be set forth in part in the description which follows and, in part, will be obvious from the description, or may be learned by practice of the disclosure.

In accordance with one aspect of the present disclosure, a display device may include: a display panel; and at least one light source module. The at least one light source module may be disposed behind the display panel. The at least one light source module may be configured to supply light to the display panel. The at least one light source module may include: a plurality of light sources and a PCB on which the plurality of light sources may be arranged. The plurality of light sources may be arranged in a plurality of first rows extending in a first direction in which sequential light sources of the plurality of first rows are separated by a first distance in the first direction, and a plurality of second rows extending in the first direction in which sequential light sources of the plurality of second rows are separated by a second distance in the first direction. The plurality of first rows may be alternately and sequentially arranged with the plurality of second rows in a second direction. At least one of the first distance and the second distance may be non-uniform.

The light sources of the plurality of first rows and the corresponding light sources of the plurality of second rows may be arranged with an offset in the first direction. The offset may increase gradually from one edge in the first direction of the at least one light source module.

The offset may increase up to half of the first distance or the second distance.

The at least one light source module may be arranged such that a smallest offset is located along both edges in the first direction of the display panel.

The at least one light source module may comprise a pair of light source modules arranged adjacent to one another in the second direction. The pair of light source modules may be arranged such that the plurality of first rows and the plurality of second rows alternate between the pair of light source modules Each module of the at least one light source module may include a connector to which a cable for supplying power or a signal to the plurality of light sources is connected. The connector may include a connecting part connected to the PCB, and an inserting part into which the cable is inserted. The PCB may include an electrical pattern for driving the plurality of light sources on a front side of the PCB on which the plurality of light sources are arranged, and a through hole configured to accommodate the connector. The connector may be disposed in the through hole of the PCB such that the connecting part is connected to the front side of the PCB, and the cable is inserted into the inserting part on a rear side of the PCB.

The connector may include at least one catching protrusion disposed in the inserting part. The at least one catching protrusion may be configured to prevent the cable from departing from the connector.

In accordance with another aspect of the present disclosure, a display device may include: a display panel; and at least one light source module. The at least one light source module may be disposed behind the display panel. The at least one light source module may be configured to supply light to the display panel. A first light source module of the at least one light source module may include a plurality of light sources arranged on the first light source module. The plurality of light sources may be arranged in a first pattern along a first edge of the first light source module and a second pattern along a second edge of the first light source module. The plurality of light sources may gradually transition from the first pattern to the second pattern between the first edge and the second edge.

The first pattern may be similar to a square arrangement and the second pattern may be similar to a triangle arrangement.

The plurality of light sources may transition to the second pattern partway between the first edge and the second edge.

The at least one light source module may comprise a second light source module arranged adjacent to the first light source module. The second light source module may comprise a plurality of light sources arranged on the second light source module. The plurality of light sources of the second light source module may arranged in the second pattern.

The plurality of light sources may be arranged in a plurality of first rows extending in a first direction in which sequential light sources of the plurality of first rows are separated by a first distance in the first direction, and a plurality of second rows extending in the first direction in which sequential light sources of the plurality of second rows are separated by a second distance in the first direction. The plurality of first rows may be alternately and sequentially arranged with the plurality of second rows in a second direction.

According to a difference between the first distance and the second distance, the light sources of the plurality of first rows and the corresponding light sources of the plurality of second rows may be arranged with an offset in the first direction. The offset may increase gradually from one edge in the first direction of the first light source module.

The offset may increase up to half of the first distance or the second distance.

The at least one light source module may be arranged such that a smallest offset is located along both edges in the first direction of the display panel.

The at least one light source module may comprise a second light source module arranged adjacent to the first light source module in the second direction. The first light source module and the second light source module may be arranged such that the plurality of first rows and the plurality of second rows alternate between the first light source module and the second light source module.

In accordance with another aspect of the present disclosure, a display device includes: a display panel; and at least one light source module. The at least one light source module may be disposed behind the display panel. The at least one light source module may be configured to supply light to the display panel. The at least one light source module may comprise a plurality of light sources. The plurality of light sources may be arranged in a plurality of first rows extending in a first direction in which sequential light sources of the plurality of first rows are separated by a first distance in the first direction, and a plurality of second rows extending in the first direction in which sequential light sources of the plurality of second rows are separated by a second distance in the first direction. The plurality of first rows may be alternately and sequentially arranged with the plurality of second rows in a second direction. The at least one light source module may further comprise at least one first section in which at least one of the first distance and the second distance is non-uniform, and at least one second section arranged adjacent to the at least one first section in which the first distance and the second distance are uniform.

The light sources of the plurality of first rows and the corresponding light sources of the plurality of second rows may be arranged with an offset in the first direction. The offset may increase gradually from one edge in the first direction of the first section.

The offset may increase up to half of the first distance or the second distance.

The at least one first section may be arranged such that a smallest offset is located along both edges in the first direction of the at least one light source module.

BRIEF DESCRIPTION OF THE DRAWINGS

The above and other aspects of the disclosure will become apparent and more readily appreciated from the following description of the exemplary embodiments, taken in conjunction with the accompanying drawings of which:

FIGS. 3A and 3B are plan views depicting exemplary arrangements of a plurality of light sources;

DETAILED DESCRIPTION OF EXEMPLARY EMBODIMENTS

Figure 1:
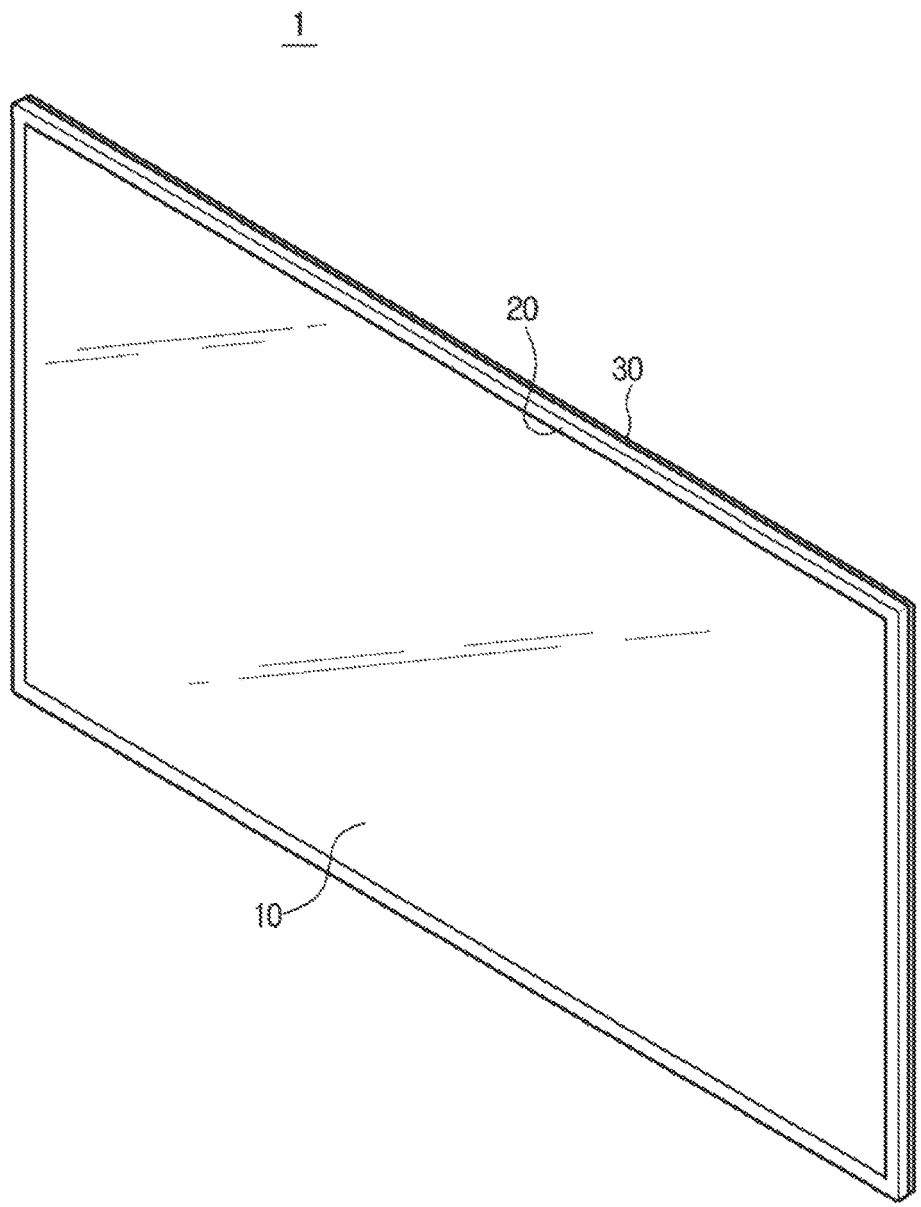
FIG. 1 is a perspective view schematically showing an outer appearance of a display device according to an exemplary embodiment of the present disclosure.

Hereinafter, a display device according to the present disclosure will be described in detail with reference to the accompanying drawings. In the following description, it is to be understood that the singular forms "a," "an," and "the" include plural referents unless the context clearly dictates otherwise. Also, for convenience of description, the shapes and sizes of components may be more or less exaggeratedly shown in the drawings.

The term "display device," as used in the present disclosure, is a general term used to reference devices that display images. Among other examples, the display device may include a television, a monitor, or the like. Hereinafter, as an example of the display device, a television will be described.

Among other examples, the television may include a flat television, a curved television, or a flexible or bendable television. Hereinafter, a flat television will be described as an example of the television.

Figure 2:
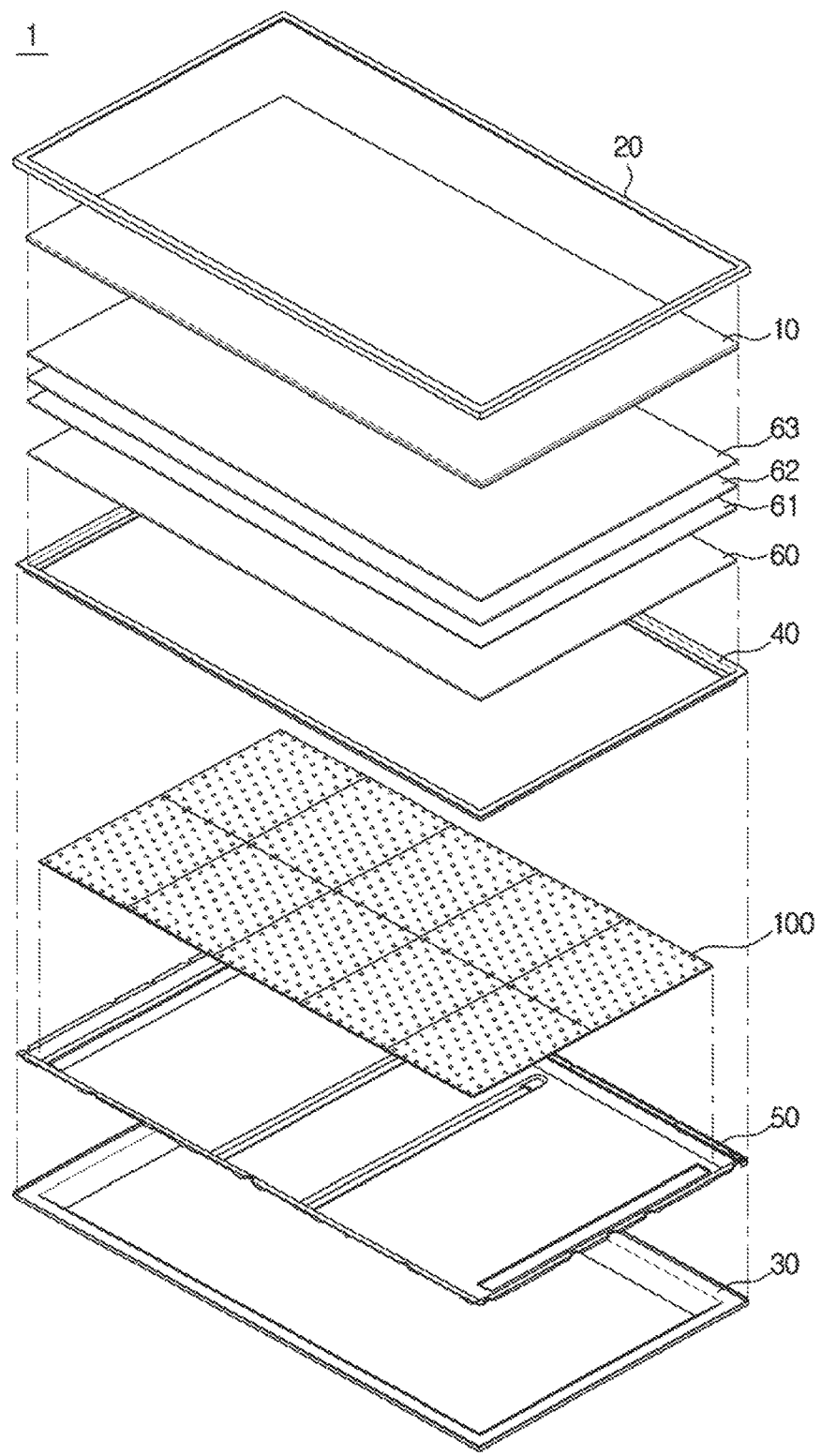
FIG. 2 is an exploded perspective view of a display device according to an exemplary embodiment of the present disclosure.

FIG. 1 is a perspective view schematically showing an outer appearance of a display device according to an exemplary embodiment of the present disclosure, and FIG. 2 is an exploded perspective view of the display device of FIG. 1 according to an exemplary embodiment of the present disclosure.

Referring to FIGS. 1 and 2, a display device 1 may include a display panel 10 that displays images. Among other examples, the display panel 10 may be a flat display panel or a curved display panel according to the type and kind of the display device 1. That is, if the display device 1 is a flat television as shown in FIG. 1, the display panel 10 may accordingly be a flat display panel. Alternatively, if the display device 1 is a curved television, the display panel 10 may accordingly be a curved display panel. Further, if the display device 1 is a flexible or bendable television, the display panel 10 may accordingly be a flexible or bendable display panel.

The display device 1 may further include a front case 20 and a rear case 30 configured to accommodate the display panel 10 and various components of the display device 1.

The front case 20 may be disposed in front of the display panel 10, and configured to surround the display panel 10. The rear case 30 may be disposed behind the display panel 10, and configured to surround various components of the display device 1.

The display device 1 may include a stand or base configured to support the display device 1. In some exemplary embodiments, the stand or base may be removably coupled with the display device 1. Additionally or alternatively, the display device 1 may include a mounting bracket configured to support the display device 1. For example, the display device may be fixed on a wall or other surface using the mounting bracket. In some exemplary embodiments, the wall mounting bracket may be removably coupled with the display device 1.

Among other various components, a power supply board—configured to supply power to the display device 1, a signal processing board—configured to process various images and sound signals, and a timing control board—configured to transfer image signals to the display panel 10, may be disposed within the front case 20 and the rear case 30.

As shown in FIG. 2, the display device 1 may include a middle mold 40 configured to support the display panel 10.

The display device 1 may further include a backlight unit 100 disposed behind the display panel 10. The backlight unit 100 may be configured to supply light to the display panel 10. The backlight unit 100 may include a plurality of light source modules 110 (see FIG. 4). Each light source module 110 may include a PCB 120 and a plurality of light sources 130 (see FIG. 3A).

The plurality of light source modules 110 may be coupled with a bottom chassis 50. In some exemplary embodiments, the plurality of light source modules 110 may be removably coupled with the bottom chassis 50. For example, the plurality of light source modules 110 may be slidingly coupled with the bottom chassis 50. The plurality of light source modules 110 may be oriented such that the plurality of light sources 130 faces the display panel 10.

The plurality of light sources 130 may be mounted on the PCB 120 in a predetermined pattern. The plurality of light sources 130 may be configured to supply light to the display panel 10. Among other types and kinds of light sources, the plurality of light sources 130 may include a plurality of Light Emitting Diodes (LEDs) configured to generate light. The plurality of light source modules 110 will be described in more detail below.

The display apparatus 1 may include a top chassis coupled to a front portion of the middle mold 40. The display panel 10 may be disposed between the top chassis and the middle mold 40.

The display device 1 may further include the bottom chassis 50 coupled to a rear portion of the middle mold 40. As shown in FIG. 2, the backlight unit 100 may be disposed between the display panel 10 and the bottom chassis 50.

The display device 1 may further include a diffusion sheet 60. The diffusion sheet 60 may be in the shape of a flat sheet. The diffusion sheet 60 may be disposed between the display panel 10 and the backlight unit 100. The diffusion sheet 60 may be configured to diffuse light supplied from the backlight unit 100.

The display device 1 may further include an additional diffusion sheet 61, a prism sheet 62, and a protection sheet 63 sequentially disposed between the display panel 10 and the diffusion sheet 60.

As shown in FIG. 2, the additional diffusion sheet 61 may be disposed in front of the diffusion sheet 60. The additional diffusion sheet 60 may further diffuse light diffused by the diffusion sheet 60. The prism sheet 62 may be disposed in front of the additional diffusion sheet 61. The prism sheet 62 may focus light diffused by the diffusion sheet 60 and the additional diffusion sheet 61 in a direction that is normal to the display panel 10. The prism sheet 62 may include a prism-shaped pattern. The protection sheet 63 may be disposed in front of the prism sheet 62. The protection sheet 63 may be configured to protect the prism sheet 62. The number and sequence of the additional diffusion sheet 61, the prism sheet 62, and the protection sheet 63 are not limited to the number and sequence discussed above.

In some exemplary embodiments, the display device 1 may further include a Dual Brightness Enhancement Film (DBEF). The DBEF may improve brightness of the display device 1 by reflecting light not passed through a lower polarizing plate of the display panel 10 through the lower polarizing plate.

Figure 3A:
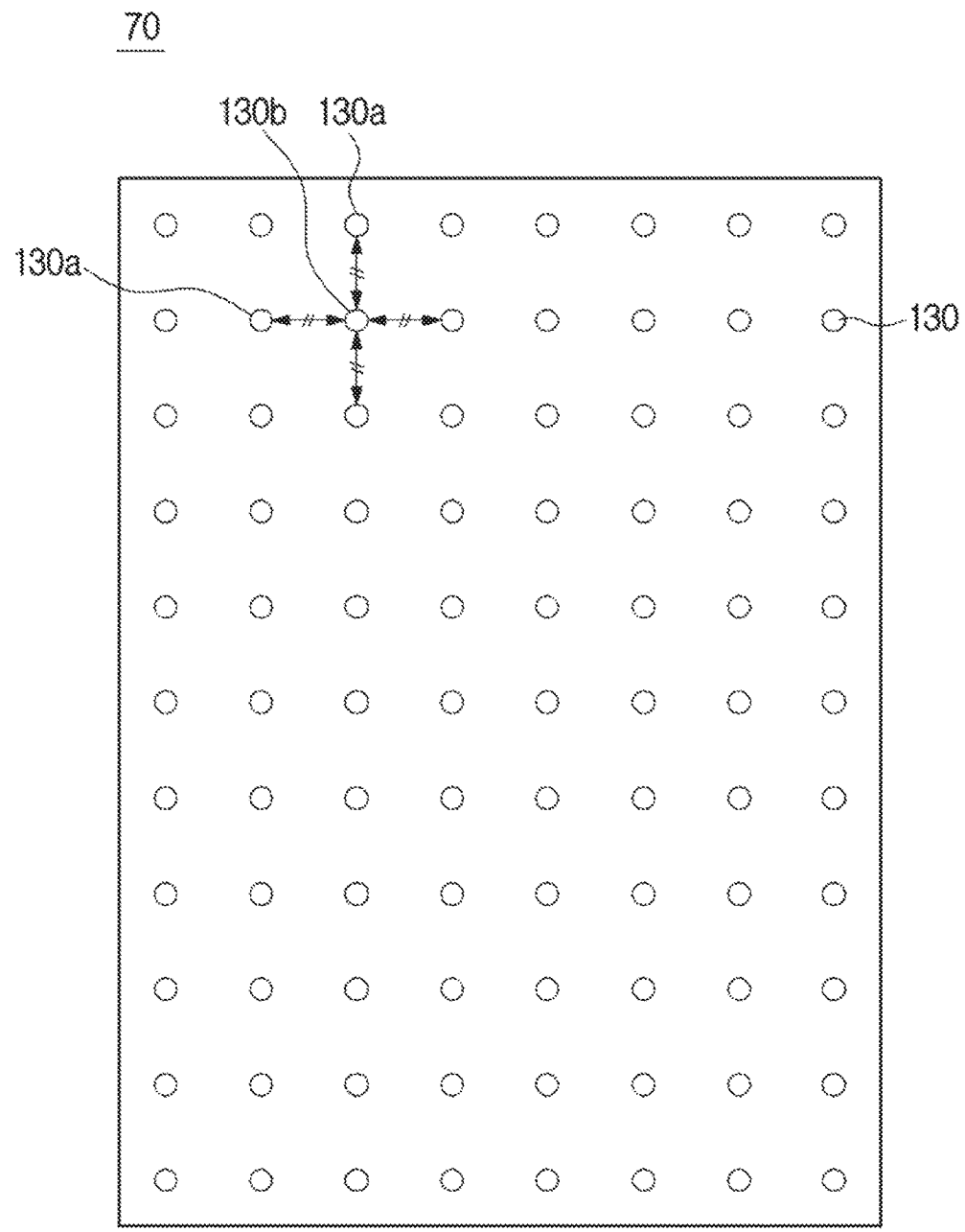
Figure 4:
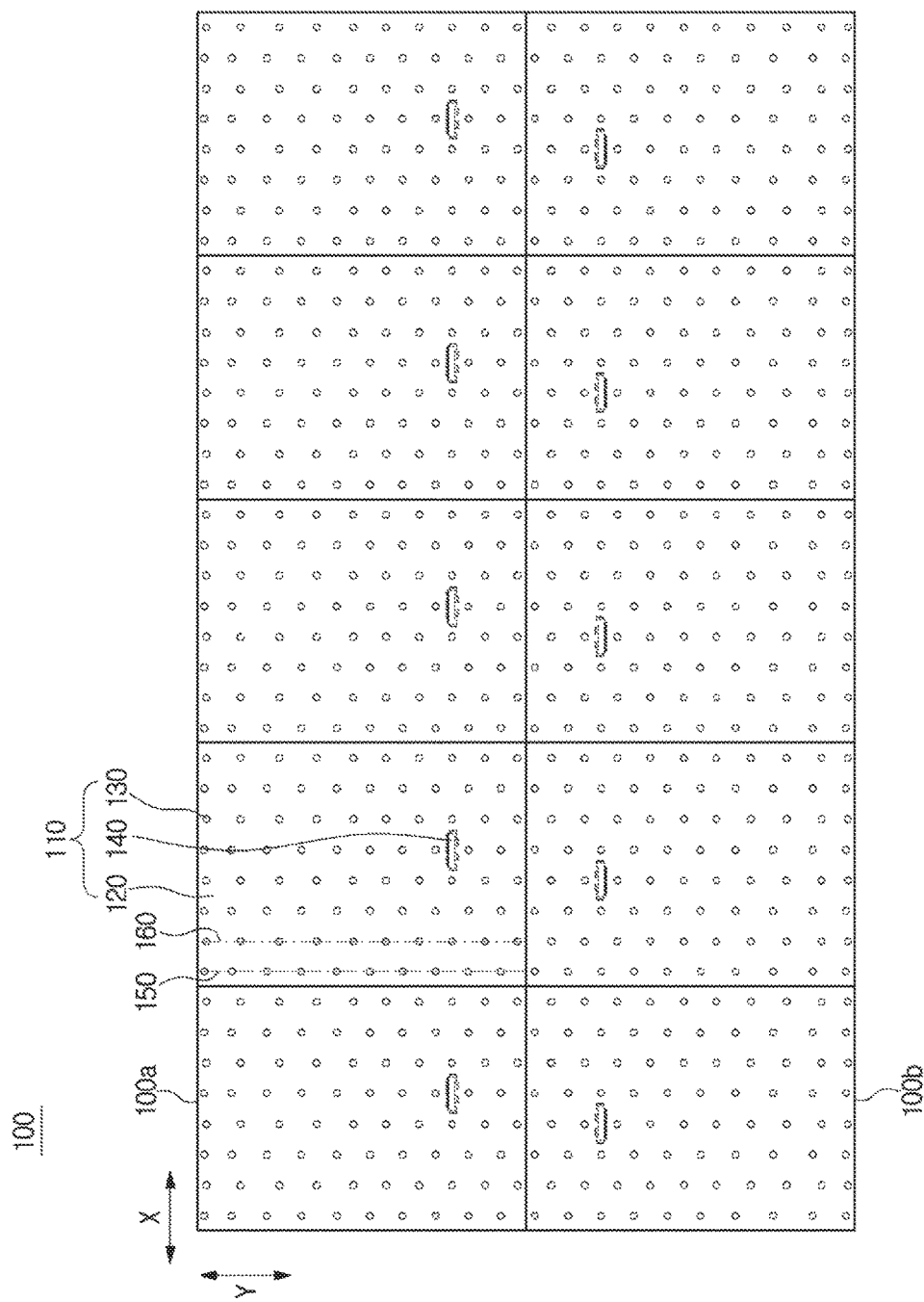
FIG. 4 is a plan view of a backlight unit according to an exemplary embodiment of the present disclosure.
Figure 5:
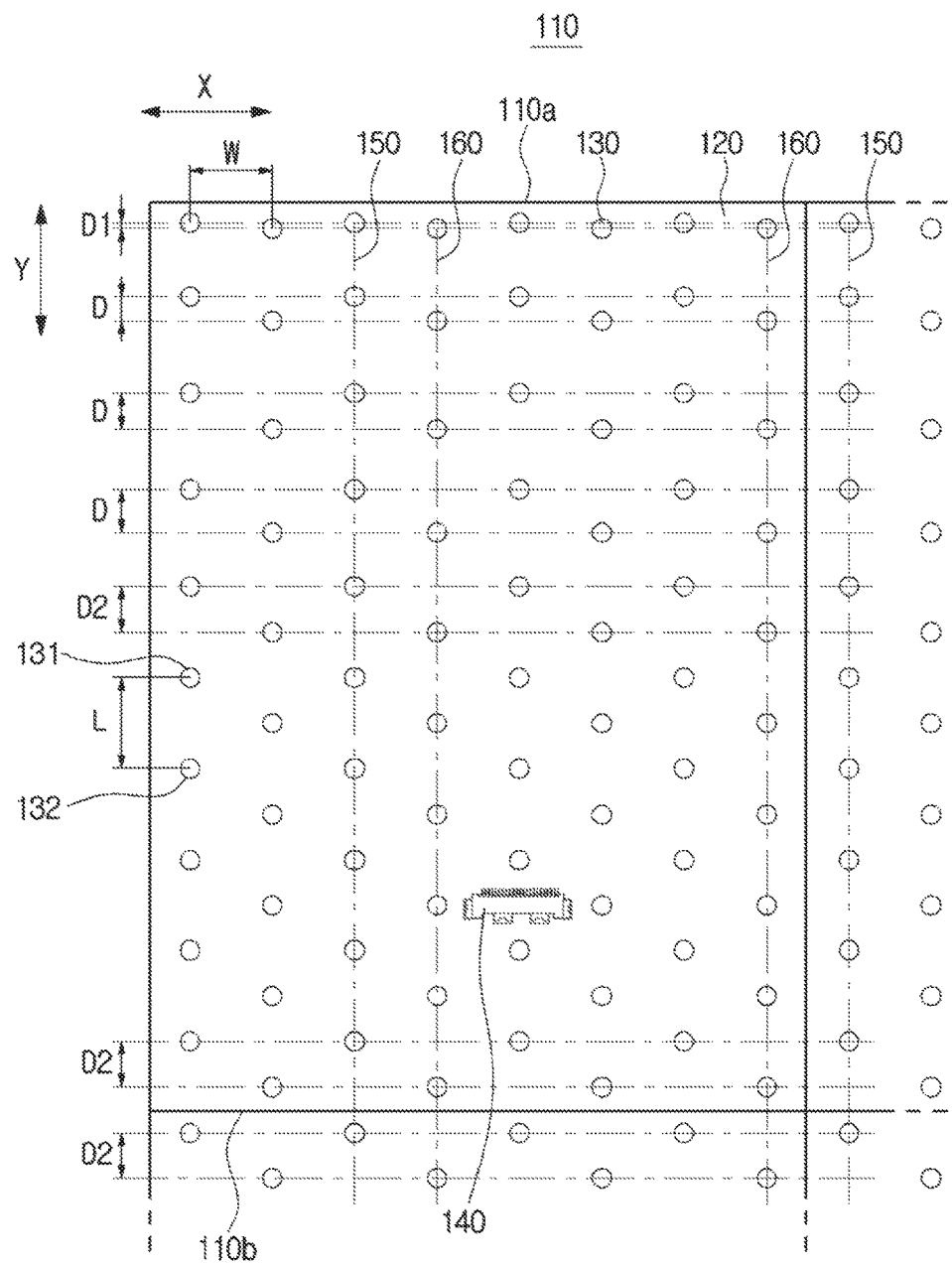
FIG. 5 is an enlarged view of a light source module of the backlight unit of FIG. 4.

FIGS. 3A and 3B show exemplary arrangements of the plurality of light sources 130, FIG. 4 is a plan view of the backlight unit 100 according to an exemplary embodiment of the present disclosure, and FIG. 5 is an enlarged view of the light source module 110 of the backlight unit 100 according to an exemplary embodiment of the present disclosure.

Among other arrangements, FIG. 3A depicts the plurality of light sources 130 arranged on the PCB 120 in a square arrangement 70 in which four light sources 130a are equally spaced from a light source 130b along two axes which intersect the light source 130b at an angle of 90 degrees. As another exemplary arrangement, FIG. 3B depicts the plurality of light sources 130 arranged on the PCB 120 in a triangle arrangement 80 in which six light sources 130c are equally spaced from a light source 130d along three axes which intersect the light source 130d at an angle of 60 degrees.

The square arrangement 70 may have the advantages of brightness and outer appearance along the edges and corners. The square arrangement 70, however, may have the disadvantage of producing "Mura" failure, i.e., unevenness. This unevenness may be caused by unevenness in an amount of light due to the relatively long distances between the light sources 130 in the diagonal direction.

The triangle arrangement 80 may have the advantage of generally not producing "Mura" failure as the distances between the light sources 130 in the diagonal direction are relatively short. The triangle arrangement 80, however, may have the disadvantage of producing "Mura" failure along the edges as the light sources 130 may be arranged unevenly along the edges. The triangle arrangement 80 may further have the disadvantage of brightness degradation along at least some of the corners.

In addition, if blue LEDs are used as the light sources 130, "Mura" failure may increase due to deviation of recycled light, i.e., a "recycling deviation," that may be generated by the DBEF included in the display device 1.

Referring to FIGS. 4 and 5, in the backlight unit 100 according to an exemplary embodiment of the present disclosure, the plurality of light sources 130 may be arranged in such a way so as to obtain the advantages of the square arrangement 70 and the triangle arrangement 80.

The backlight unit 100 may include a plurality of light source modules 110. Each light source module 110 may include a plurality of light sources 130 and a PCB 120 on which the plurality of light sources 130 is arranged.

As best seen in FIG. 5, the plurality of light sources 130 may be arranged in a first row 150 extending in a first direction Y and a second row 160 also extending in the first direction Y. The first row 150 and the second row 160 may be spaced apart by a distance W in a second direction X. In the present exemplary embodiment, the distance W between the first row 150 and the second row 160 may be uniform. In some exemplary embodiments, however, the distance W between the first row 150 and the second row 160 may be non-uniform, i.e., varied, as necessary.

The light sources 130 of the first row 150 and the light sources 130 of the second row 160 may be sequentially spaced apart by a distance L in the first direction Y. For example, as shown in FIG. 5, a light source 131 and a light source 132 sequentially arranged in the first row 150 are spaced apart by the distance L in the first direction Y. The distance L between sequential light sources 130 may be uniform, however, as will be appreciated from the description below, the distance L between sequential light sources 130 may be non-uniform, i.e., varied, as necessary.

The number of light sources 130 of the first row 150 does not need to be equal to the number of light sources 130 of the second row 160. The light sources 130 of the first row 150 and the corresponding light sources 130 of the second row 160 may be offset from one another by a distance D in the first direction Y. The offset distance D gradually increases in the first direction Y from an offset distance D1 along a first edge 110a of the light source module 110 to an offset distance D2 partway between the first edge 110a and a second edge 110b of the light source module 110. That is, partway between the first edge 110a and the second edge 110b, the offset distance D increases to the offset distance D2. The offset distance D2 may increase up to half of the largest distance L between sequential light sources 130.

After the offset distance D increases to the offset distance D2, the offset distance D2 may be maintained in the first direction Y to the second edge 110b of the light source module 110.

As described above, the backlight unit 100 may include the plurality of light source modules 110. The plurality of light source modules 110 may be arranged in the first direction Y and the second direction X. As shown in FIGS. 4 and 5, adjacent light source modules 110 may be arranged in the first direction Y such that the light sources 130 offset by the offset distance D1 are located along both edges 100a, 100b of the backlight unit 100 and such that the light sources 130 offset by the offset distance D2 are located within an intermediate region of the backlight unit 100. Adjacent light source modules 110 may be arranged in the second direction X so as to alternate between the first row 150 and the second row 160 between adjacent light source modules 110.

As shown in FIGS. 4 and 5, because adjacent light source modules 110 are arranged in the first direction Y such that the light sources 130 offset by the offset the offset distance D1 are located along both edges 100a, 100b of the backlight unit 100 and such that the light sources 130 offset by the offset the offset distance D2 are located within the intermediate region of the backlight unit 100, the plurality of light sources 130 can be arranged in a pattern similar to the square arrangement 70 along the edges 100a, 100b of the backlight unit 100 and gradually transitioning to a pattern similar to the triangle arrangement 80 within the intermediate region of the backlight unit 100.

Because the plurality of light sources 130 may be arranged in a pattern similar to the square arrangement 70 along the edges 100a, 100b of the backlight unit 100, it is possible to obtain the advantages of brightness and outer appearance while limiting brightness degradation along the corners and edges of the display panel 10. It is further possible to limit the production of "Mura" failure along the edges and corners of the display panel 10 that may otherwise exist with the triangle arrangement 80. Further, because the plurality of light sources 130 may be arranged in a pattern similar to the triangle arrangement 80 in the intermediate region of the backlight unit 100, it is possible to limit the production of "Mura" failure in an intermediate region of the display panel 10 that may otherwise exist with the square arrangement 70.

Figure 6:
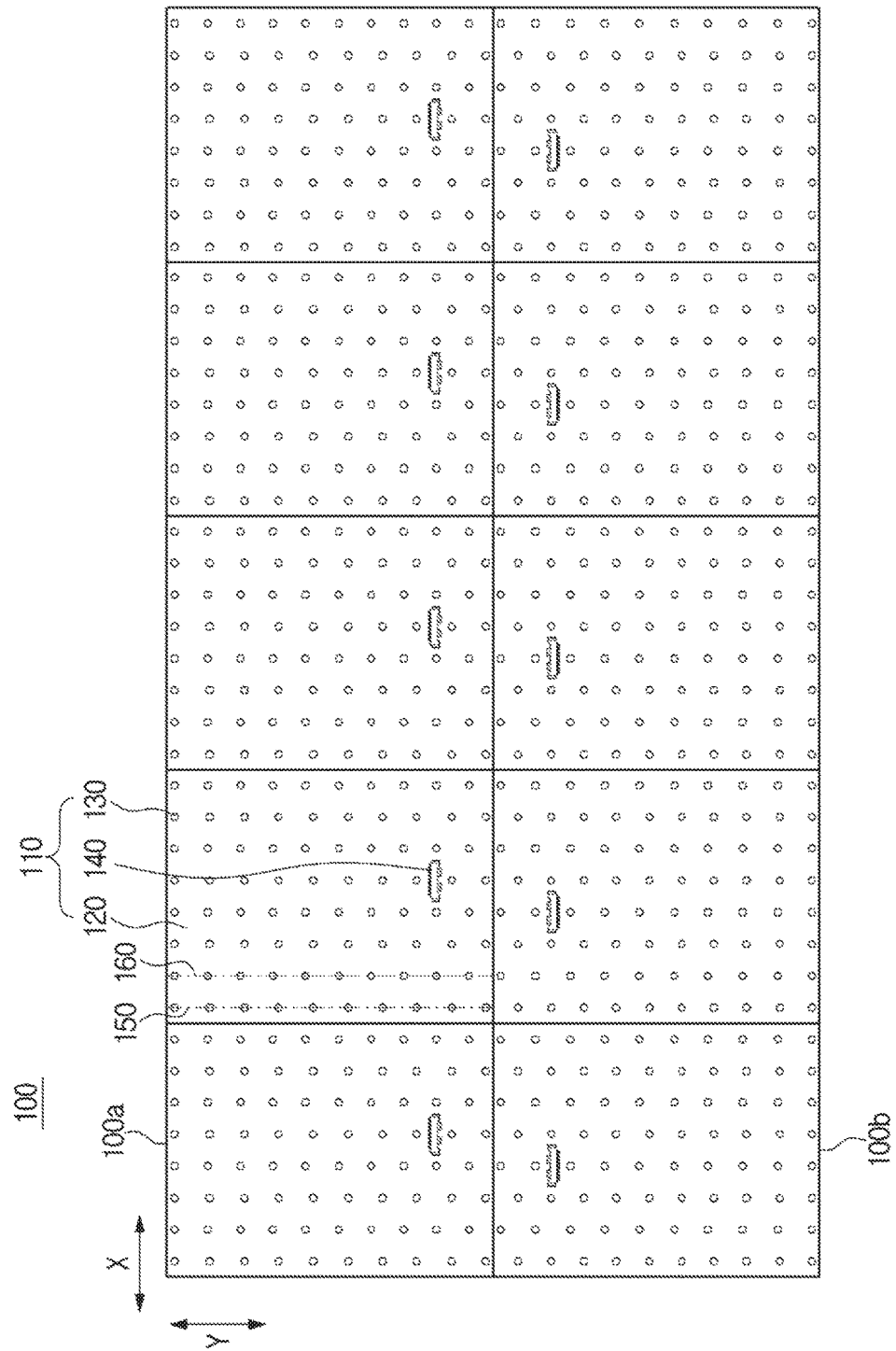
FIG. 6 is a plan view of a backlight unit according to an exemplary embodiment of the present disclosure.
Figure 7:
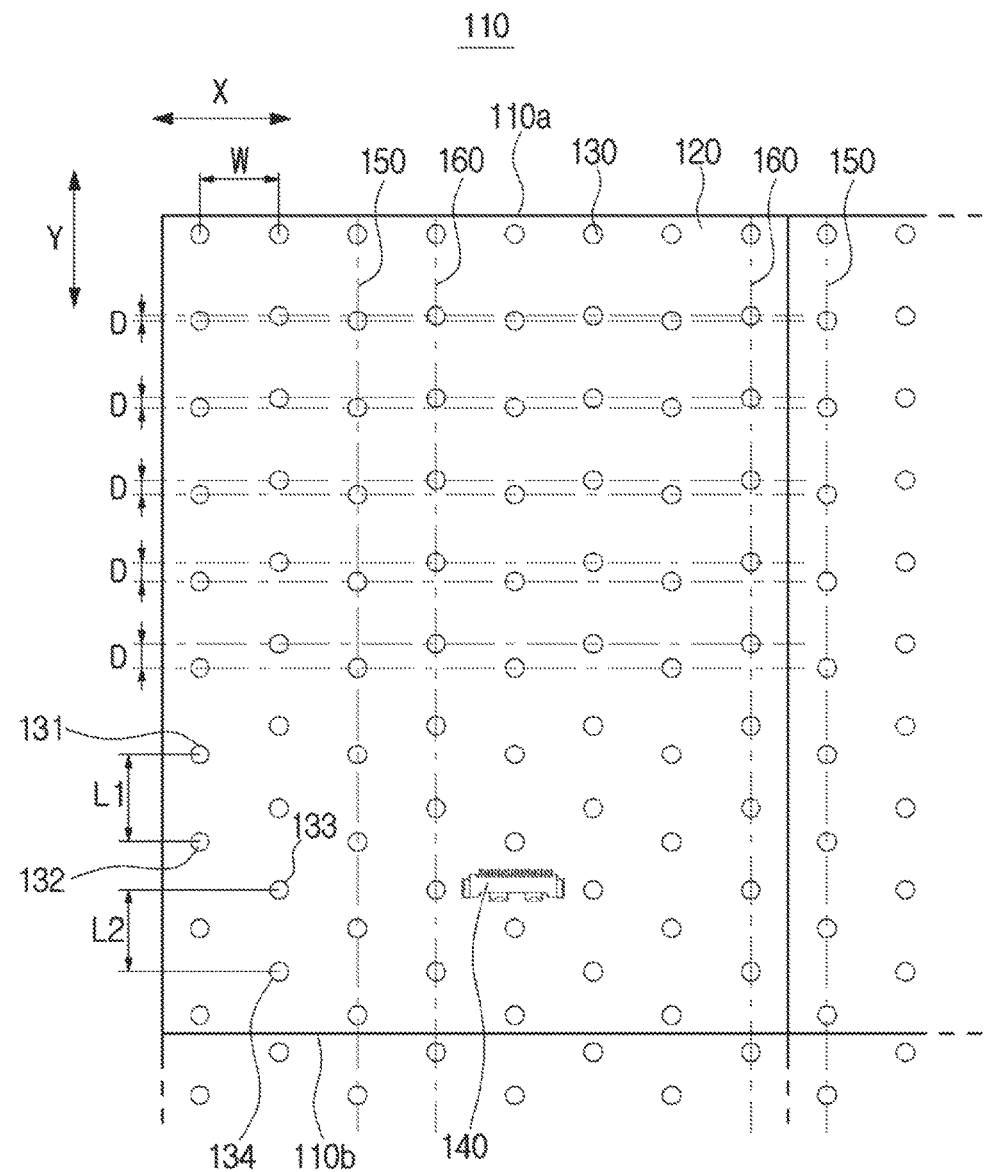
FIG. 7 is an enlarged view of a light source module of the backlight unit of FIG. 6.

FIG. 6 is a plan view of a backlight unit 100 according to an exemplary embodiment of the present disclosure, and FIG. 7 is an enlarged view of a light source module 110 of the backlight unit 100 according to an exemplary embodiment of the present disclosure.

Referring to FIGS. 6 and 7, in the backlight unit 100 according to an exemplary embodiment of the present disclosure, a plurality of light sources 130 may be arranged in a pattern similar to the square arrangement 70 along both edges 100a, 100b of the backlight unit 100, and in a pattern similar to the triangle arrangement 80 in an intermediate region of the backlight unit 100.

The backlight unit 100 may include a plurality of light source modules 110. Each light source module 110 may include a plurality of light sources 130 and a PCB 120 on which the plurality of light sources 130 is arranged.

As best seen in FIG. 7, the plurality of light sources 130 may be arranged in a first row 150 extending in a first direction Y and a second row 160 also extending in the first direction Y. The first row 150 and the second row 160 may be spaced apart by a distance W in a second direction X. In the present exemplary embodiment, the distance W between the first row 150 and the second row 160 may be uniform. In some exemplary embodiments, however, the distance W between the first row 150 and the second row 160 may be non-uniform, i.e., varied.

The light sources 130 of the first row 150 may be sequentially spaced apart by a predetermined distance L1 in the first direction Y. For example, as shown in FIG. 7, a light source 131 and a light source 132 sequentially arranged in the first row 150 are spaced apart by the distance L1 in the first direction Y. The light sources 130 of the second row 160 may be sequentially spaced apart by a predetermined distance L2 in the first direction Y. For example, as shown in FIG. 7, a light source 133 and a light source 134 sequentially arranged in the second row 160 are spaced apart by the distance L2 in the first direction Y. The distance L1 between sequential light sources 130 of the first row 150 may be different from the distance L2 between sequential light sources of the second row 160. In some exemplary embodiments, the distance L1 between sequential light sources 130 of the first row 150 may be greater than the distance L2 between sequential light sources 130 of the second row 160. In other exemplary embodiments, the distance L2 between sequential light sources 130 of the second row 160 may be greater than the distance L1 between sequential light sources 130 of the first row 150.

The number of light sources 130 of the first row 150 does not need to be equal to the number of light sources 130 of the second row 160. At least some of the light sources 130 of the first row 150 and the corresponding light sources 130 of the second row 160 may be offset from one another by a distance D in the first direction Y. Corresponding light sources 130 of the first row 150 and the second row 160 are aligned along a first edge 110a of the light source module 110. The offset distance D gradually increases in the first direction Y from along the first edge 110a of the light source module 110 toward a second edge 110b of the light source module 110 as the difference between the distance L1 between sequential light sources 130 of the first row 150 and the distance L2 between sequential light sources of the second row 160 gradually accumulates. That is, although the light sources 130 of the first row 150 and the second row 160 are aligned along the first edge 110a, the light sources 130 of the first row 150 and the second row 160 gradually become further offset from one another from the first edge 110a toward the second edge 110b as the difference between the distance L1 and the distance L2 gradually accumulates. The offset distance D may increase up to half of the distance of the greater of the distance L1 or the distance L2.

As described above, the backlight unit 100 may include the plurality of light source modules 110. The plurality of light source modules 110 may be arranged in the first direction Y and the second direction X. As shown in FIGS. 6 and 7, adjacent light source modules 110 may be arranged in the first direction Y such that the light sources 130 of the first row 150 and the second row 160 are aligned along both edges 100a, 100b of the backlight unit 100 and such that the offset distance D becomes greatest where adjacent light source modules 110 adjoin one another in the first direction Y. Adjacent light source modules 110 may be arranged in the second direction X so as to alternate between the first row 150 and the second row 160 between adjacent light source modules 110.

As shown in FIGS. 6 and 7, because adjacent light source modules 110 are arranged in the first direction Y such that the light sources 130 of the first row 150 and the second row 160 are aligned along both edges 100a, 100b of the backlight unit 100 and such that the offset distance D becomes greatest where adjacent light source modules 110 adjoin one another in the first direction Y, the plurality of light sources 130 can be arranged in a pattern similar to the square arrangement 70 along the edges 100a, 100b of the backlight unit 100 and gradually transitioning to a pattern similar to the triangle arrangement 80 where adjacent light source modules 110 adjoin one another in the first direction Y.

Figure 8:
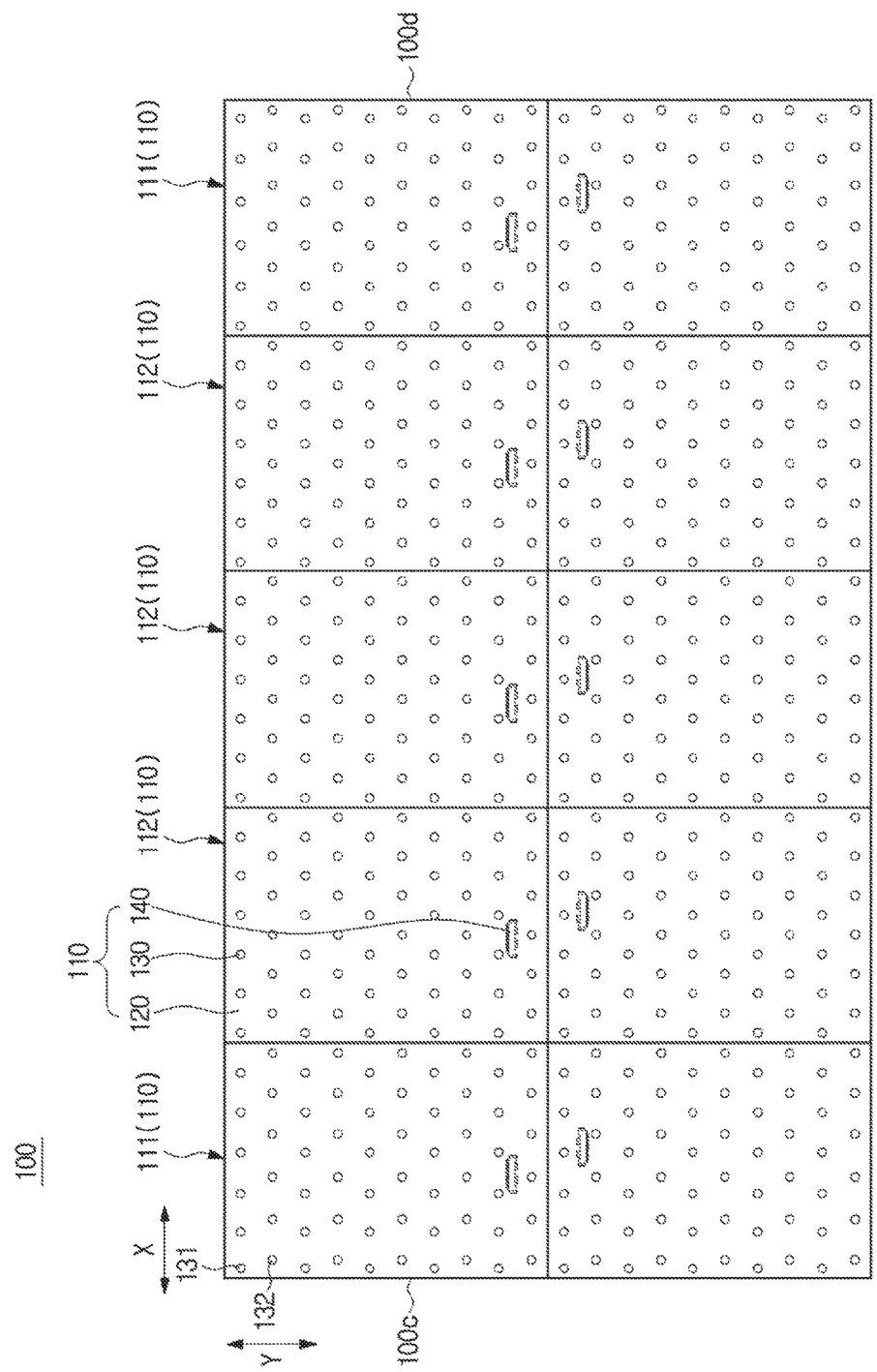
FIG. 8 is a plan view of a backlight unit according to an exemplary embodiment of the present disclosure.
Figure 9:
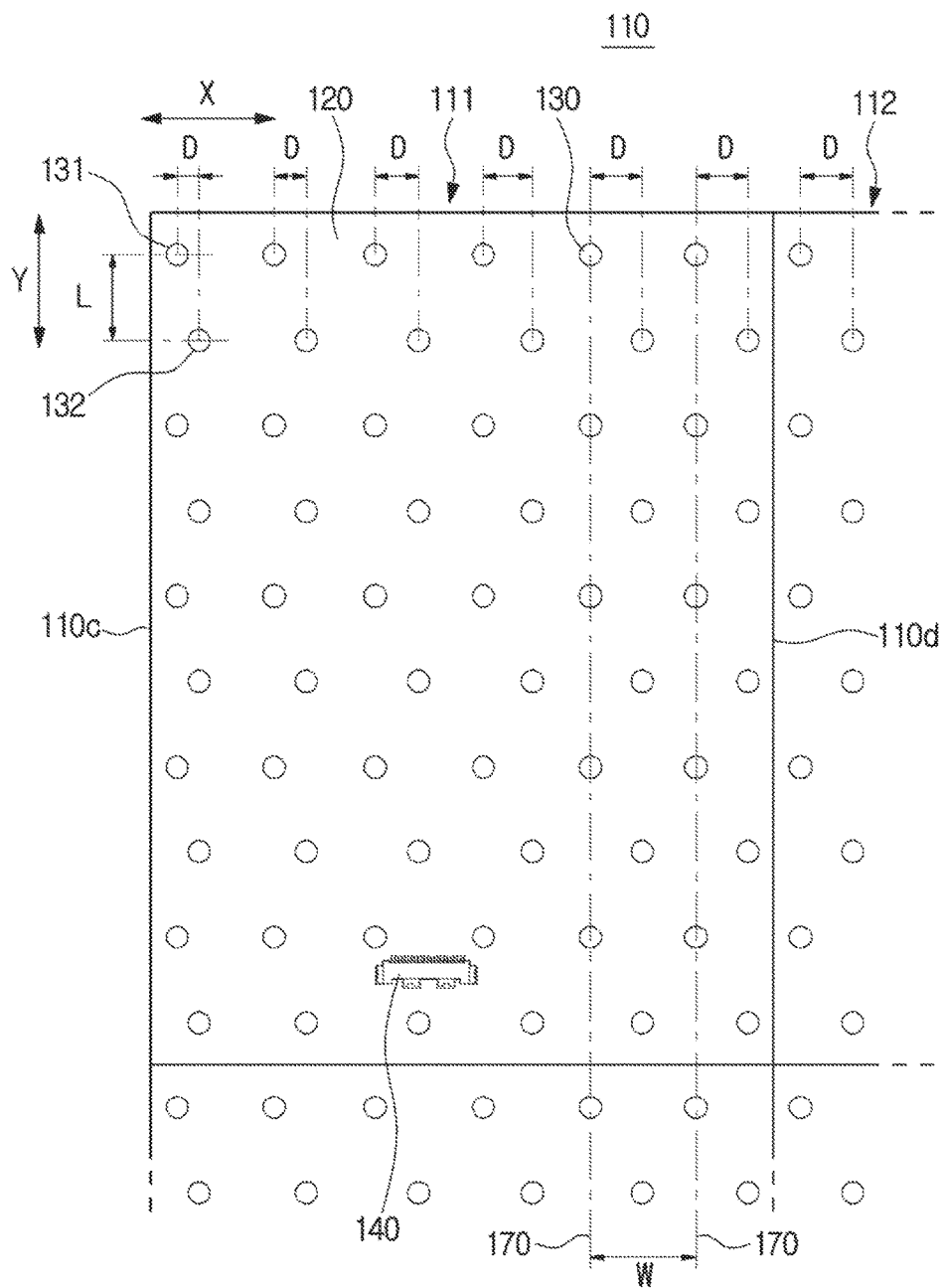
FIG. 9 is an enlarged view of a light source module of the backlight unit of FIG. 8.

FIG. 8 is a plan view of a backlight unit 100 according to an exemplary embodiment of the present disclosure, and FIG. 9 is an enlarged view of a light source module 111 of the backlight unit 100 according to an exemplary embodiment of the present disclosure.

Referring to FIGS. 8 and 9, the backlight unit 100 according to an exemplary embodiment of the present disclosure may include a plurality of light source modules 110. Each light source module 110 may include a plurality of light sources 130 and a PCB 120 on which the plurality of light sources 130 is arranged.

The plurality of light sources 130 may include a first light source 131 and a second light source 132. The first light source 131 and the second light source 132 may be spaced apart from one another by a distance L in a first direction Y and by an offset distance D in a second direction X. The first light source 131 and the second light source 132 may be alternately and sequentially arranged into a plurality of rows 170 extending in the first direction Y. The plurality of rows 170 may be sequentially arranged in the second direction X. Sequential rows 170 of the plurality of rows 170 may be spaced apart by a predetermined distance W in the second direction X. In the present exemplary embodiment, the distance W between sequential rows 170 may be uniform. In some exemplary embodiments, however, the distance W between sequential rows 170 may be non-uniform, i.e., varied.

The plurality of light source modules 110 may include a first light source module 111 and a second light source module 112 having an arrangement of light sources 131, 132 that is different from that of the first light source module 111.

The light sources 131, 132 of the first light source module 111 are arranged relative to one another such that the offset distance D gradually increases in the second direction X from an offset distance D1 along a first edge 110c of the first light source module 111 to an offset distance D2 along a second edge 110d of the first light source module 111. That is, the offset distance D gradually increases across the width of the first light source module 111 from the offset distance D1 to the offset distance D2.

The plurality of rows 170 of the first light source module 111 may be arranged such that the offset distance D in the second direction X between the first light source 131 and the second light source 132 increases until the offset distance D in the second direction X between the first light source 131 and the second light source 132 increases up to half of the distance W between sequential rows 170. That is, the offset distance D2 may be half of the distance W.

The light sources 131, 132 of the second light source module 112, are arranged relative to one another such that the offset distance D in the second direction X between the first light source 131 and the second light source 132 of each row 170 is the offset distance D2. As described above, the offset distance D2 may be half of the distance W.

When the plurality of light source modules 110 are arranged in the backlight unit 100, a pair first light source modules 111 arranged in the first direction Y may be respectively arranged along both edges 100c, 100d of the backlight unit 100. The first light source modules 111 may be arranged such that rows 170 having an offset distance D1 in the second direction X between the first light source 131 and the second light source 132 are respectively located at both ends 100c, 100d of the backlight unit 100. A total of three pair of the second light source modules 112 arranged in the first direction Y are arranged to between the pairs first light source modules 111 toward an intermediate region of the backlight unit 100.

Referring to FIG. 8, because the five light source modules 110 are arranged in the second direction X such that a pair of first light source modules 111 are respectively arranged along both edges 100c, 100d of the backlight unit 100 and because a total of three pairs of second light source modules 112 are arranged between the pairs of first light source modules 111, the plurality of light sources 130 can be arranged in a pattern similar to the square arrangement 70 along the edges 100c, 100d of the backlight unit 100 and gradually transition to a pattern similar to the triangle arrangement 80 toward an intermediate region of the backlight unit 100.

Figure 10:
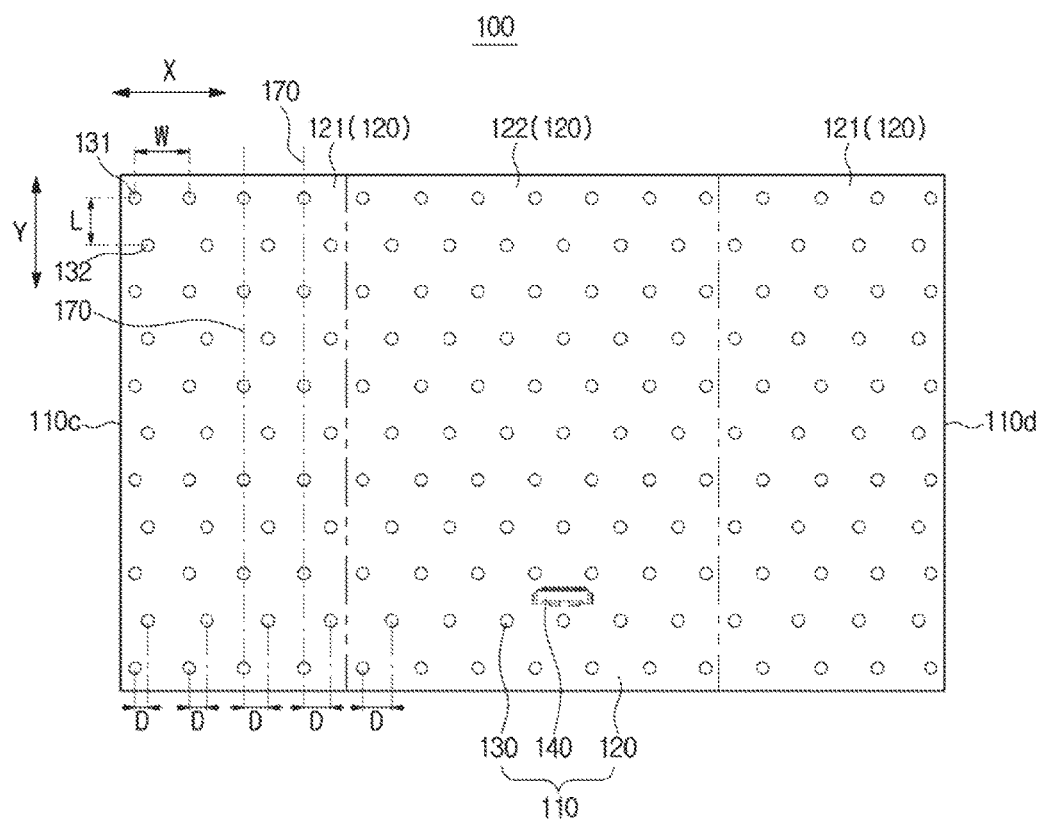
FIG. 10 is a plan view of a backlight unit according to an exemplary embodiment of the present disclosure.
Figure 11:
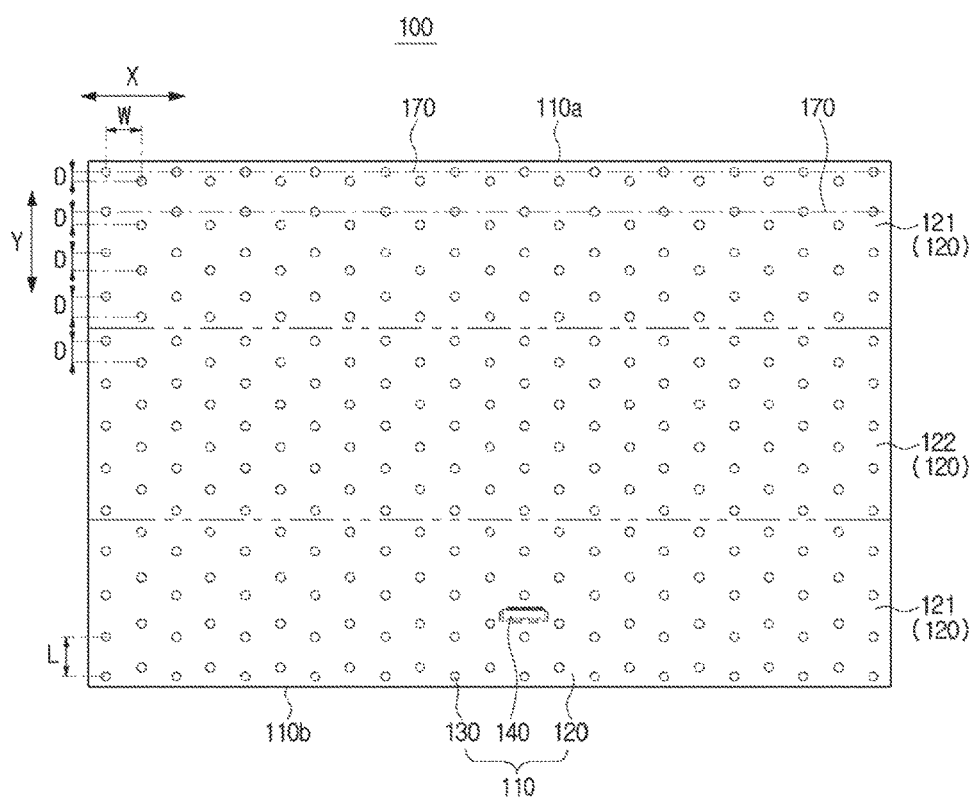
FIG. 11 is a plan view of a backlight unit according to an exemplary embodiment of the present disclosure.

FIGS. 10 and 11 are plan views of backlight units 100 according to exemplary embodiments of the present disclosure.

Referring to FIG. 10, the backlight unit 100 according to an exemplary embodiment of the present disclosure may include a light source module 110. The light source module 110 may include a plurality of light sources 130 and a PCB 120 on which the plurality of light sources 130 is arranged.

The plurality of light sources 130 may include a first light source 131 and a second light source 132. The first light source 131 and the second light source 132 may be spaced apart from one another by a distance L in a first direction Y and by an offset distance D in a second direction X. The first light source 131 and the second light source 132 may be alternately arranged and sequentially arranged into a plurality of rows 170 extending in the first direction Y. The plurality of rows 170 may be sequentially arranged in the second direction X. Sequential rows 170 of the plurality of rows 170 may be spaced apart by a predetermined distance W in the second direction X. In the present exemplary embodiment, the distance W between sequential rows 170 may be uniform. In some exemplary embodiments, however, the distance W between sequential rows 170 may be non-uniform, i.e., varied.

The light source module 110 may include a first section 121 and a second section 122 having an arrangement of light sources 131, 132 that is different from that of the first section 121.

A pair of first sections 121 may be arranged along both edges 110c, 110d of the light source module 110. The light sources 131, 132 of the first sections 121 are arranged such that the offset distance D gradually increases in the second direction X from an offset distance D1 along the edges 110c, 110d to an offset distance D2 toward the second section 122 of the light source module 110. That is, the offset distance D gradually increases across the width of the first section 121 from the offset distance D1 to the offset distance D2. The offset distance D2 may be half of the distance W in the second direction X between sequential rows 170.

The second section 122 may be arranged between the first sections 121. The light sources 131, 132 of the second section 122 may be arranged such that the offset distance D in the second direction X between the first light source 131 and the second light source 132 of each row 170 may be the offset distance D2. As described above, the offset distance D2 may be half of the distance W.

Referring to FIG. 11, an arrangement of a plurality of light sources 130 of a backlight unit 100 shown in FIG. 11 corresponds to the arrangement of the plurality of light sources 130 of the backlight unit 100 shown in FIG. 10 having been rotated by 90 degrees.

More specifically, the plurality of light sources 130 may include a first light source 131 and a second light source 132. The first light source 131 and the second light source 132 may be spaced apart from one another by an offset distance D in a first direction Y and by a distance W in a second direction X. The first light source 131 and the second light source 132 may be alternately and sequentially arranged into a plurality of rows 170 extending in the second direction X. The plurality of rows 170 may be sequentially arranged in the first direction Y. Sequential rows 170 of the plurality of rows 170 may be spaced apart by a predetermined distance L in the first direction Y.

The light source module 110 may include a first section 121 and a second section 122 having an arrangement of light sources 131, 132 that is different from that of the first section 121.

A pair of first sections 121 may be arranged along both edges 110a, 110b of the light source module 110. The light sources 131, 132 of the first sections 121 are arranged such that the offset distance D gradually increases in the first direction Y from an offset distance D1 along the edges 110a, 110b to an offset distance D2 toward the second section 122 of the light source module 110. That is, the offset distance D gradually increases across the length of the first section 121 from the offset distance D1 to the offset distance D2. The offset distance D2 may be half of the distance L in the first direction Y between sequential rows 170.

The second section 122 may be arranged between the first sections 121. The light sources 131, 132 of the second section 122 may be arranged such that the offset distance D in the first direction Y between the first light source 131 and the second light source 132 of each row 170 may be the offset distance D2. As described above, the offset distance may be half of the distance L.

Referring to FIGS. 10 and 11, if the display device 1 includes the backlight unit 100 having a single PCB 120, the plurality of light sources 130 may be arranged in a pattern similar to the square arrangement 70 along the edges 100a, 100b, 100c, 100d of the backlight unit 100 and gradually transitioning to a pattern similar to the triangle arrangement 80 toward an intermediate region of the backlight unit 100.

Figure 12:
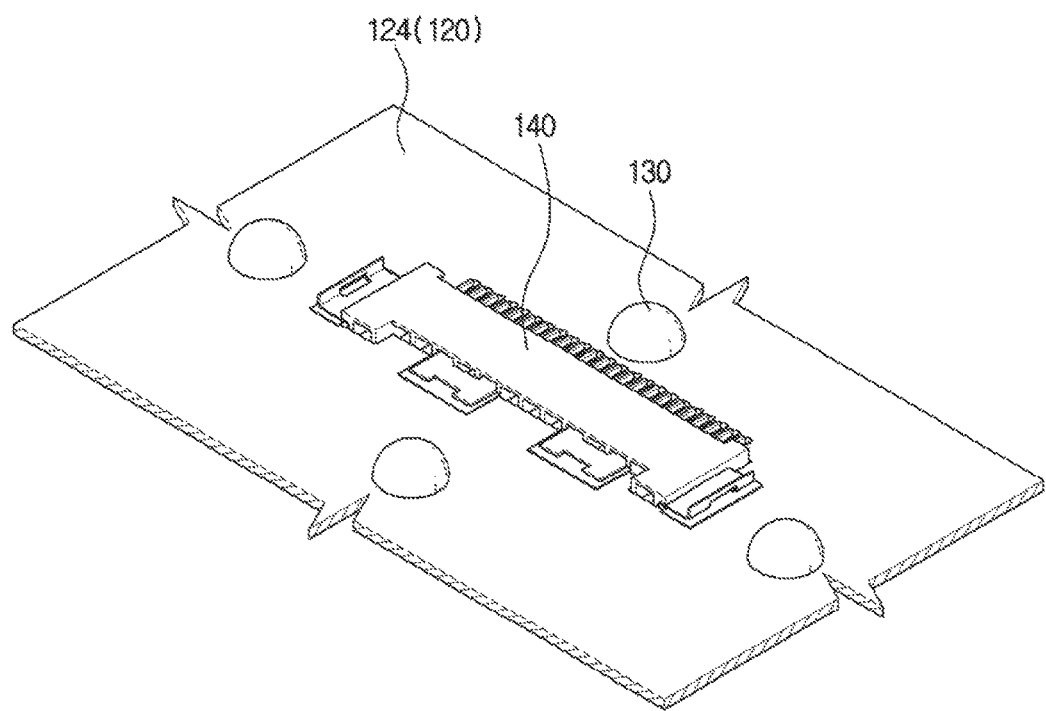
FIG. 12 is a perspective view showing a front side of a connector according to an exemplary embodiment of the present disclosure when the connector is mounted on a PCB.
Figure 13:
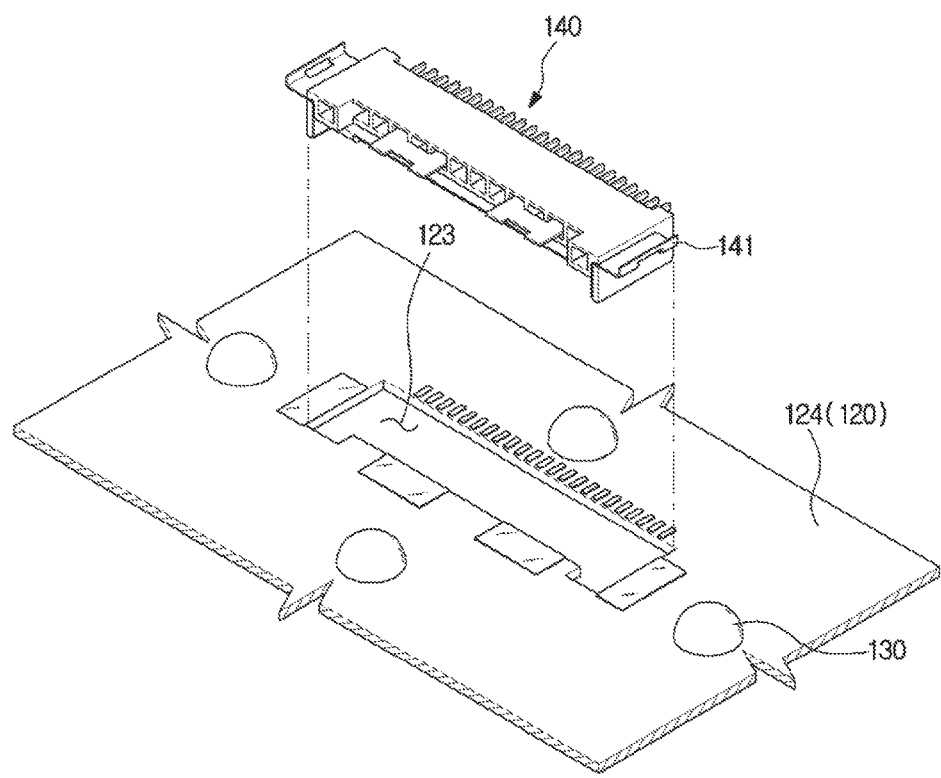
FIG. 13 is a perspective view showing the front side of the connector of FIG. 12 with the connector separated from the PCB of FIG. 12.
Figure 14:
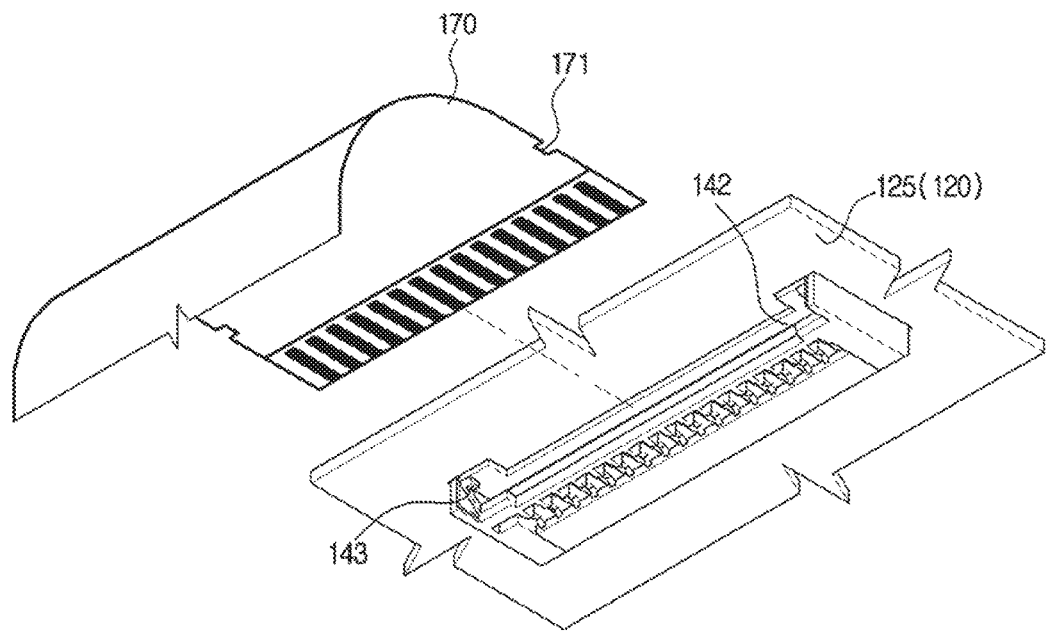
FIG. 14 is a perspective view showing a rear side of the connector of FIG. 12 with the connector mounted on the PCB of FIG. 12.
Figure 15:
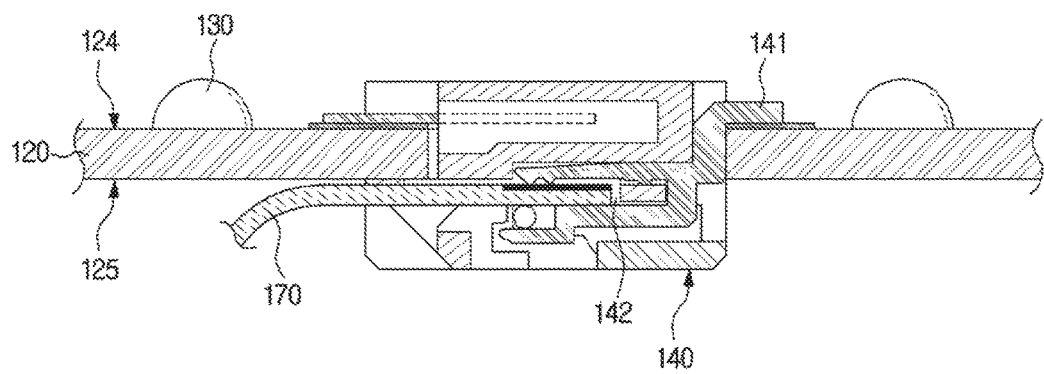
FIG. 15 is a cross-sectional view of the connector of FIG. 12 with the connector mounted on the PCB of FIG. 12.

FIG. 12 is a perspective view showing a front part of a connector 140 according to an exemplary embodiment of the present disclosure when the connector 140 is mounted on a PCB 120, FIG. 13 is a perspective view showing a front part of the connector 140 of FIG. 12 when the connector 140 is separated from the PCB 120, FIG. 14 is a perspective view showing a rear part of the connector 140 of FIG. 12 when the connector 140 is mounted on the PCB 120, and FIG. 15 is a cross-sectional view of the connector 140 of FIG. 12 when the connector 140 is mounted on the PCB 120.

In a direct type backlight unit, a flat type PCB 120 may be used, and a cable 170 for supplying power or signals to a plurality of light sources 130 may be connected to the PCB 120. The cable 170 may be a Flexible Flat Cable (FFC), and a connector 140 for connecting the FFC to the PCB 120 may be mounted on the PCB 120.

When a single-side PCB is used as the PCB 120, the plurality of light sources 130 and the connector 140 may be disposed on the same side on which an electrical pattern is printed, i.e., a front side. In this case, the connector 140 and the cable 170 may influence a "Mura" failure.

To avoid influencing a "Mura" failure, the connector 140 may be disposed on the rear side of the PCB 120, i.e., opposite of the front side, and accordingly, the PCB 120 may need to have electrical patterns printed on both sides of the PCB 120, which may lead to an increase of manufacturing costs.

For this reason, the PCB 120 according to the present disclosure may include an electrical pattern only on the front side 124 on which the plurality of light sources 130 are arranged, and include a through hole 123 for accommodating the connector 140.

The connector 140 may include a connecting part 141 that is connected to the PCB 120, and an inserting part 142 into which the cable 170 may be inserted. The connector 140 may be installed in the through hole 123. The connecting part 141 of the connector 140 may be connected to the front side 124 of the PCB 120 on which the electrical pattern is printed, by a soldering method, and the cable 170 may be inserted into the inserting part 142 of the connector 140 in the rear side 125 of the PCB 120.

The connector 140 may include a catching protrusion 143 to prevent the cable 170 from departing from the connector 140. For example, a pair of catching protrusions 143 may be respectively provided at both ends of the inserting part 142. Further, the cable 170 may include two catching grooves 171 by which the catching protrusions 143 of the connector 140 can be caught.

Because the connector 140 and the cable 170 are disposed on the rear side 125 of the PCB 120 to avoid influencing a "Mura" failure, the connector 140 can be mounted at any location of the PCB 120.

According to the exemplary embodiments of the present disclosure as described above, by efficiently arranging a plurality of light sources on a PCB, it is possible to prevent brightness "Mura" and color "Mura" that may be generated in a direct type backlight unit.

Also, according to the exemplary embodiments of the present disclosure as described above, by efficiently disposing a connector to connect a cable for supplying power and the like to a PCB, it is possible to make the connector so as to have less influence on brightness "Mura" and color "Mura," while reducing manufacturing costs of the PCB.

Although a few exemplary embodiments of the present disclosure have been shown and described, it would be appreciated by those skilled in the art that changes may be made in these exemplary embodiments without departing from the principles and spirit of the disclosure, the scope of which is defined in the claims and their equivalents.

What is claimed is:

1. A display device comprising:
  a display panel; and
  a light source module disposed to emit light towards the display panel, the light source module comprising:
    a plurality of light sources comprising:
      a plurality of first light sources arranged in a plurality of first rows extending in a first direction, wherein sequential first light sources of the plurality of first light sources are separated by first distances in the first direction, and
      a plurality of second light sources arranged in a plurality of second rows extending in the first direction, wherein sequential second light sources of the plurality of second light sources are separated by second distances in the first direction; and
    a printed circuit board (PCB) on which the plurality of light sources are arranged,
  wherein rows of the plurality of first rows are alternately arranged between rows of the plurality of second rows in a second direction,
  wherein at least one of the first distances and the second distances are non-uniform,
  wherein first light sources and second light sources arranged on a first edge of the light source module are arranged on a straight line extending in the second direction, and
  wherein the plurality of first light sources and the plurality of second light sources are arranged with an offset in the first direction, and the offset gradually increases in the first direction from the first edge of the light source module toward a second edge of the light source module.

2. The display device of claim 1, wherein the offset gradually increases up to half of a largest distance of the first distances and the second distances.

3. The display device of claim 1, wherein the light source module comprises a plurality of light source modules, wherein the plurality of light source modules are arranged such that the offset is smallest along opposing edges of the display panel in the first direction.

4. The display device of claim 1, wherein the light source module comprises a pair of light source modules arranged adjacent to one another in the second direction, wherein the pair of light source modules is arranged such that the plurality of first rows and the plurality of second rows alternate between the pair of light source modules.

5. The display device of claim 1, wherein each module of the light source module comprises a connector to which a cable for supplying power or a signal to the plurality of light sources is connected,
  wherein the connector comprises a connecting part connected to the PCB, and an inserting part into which the cable is inserted,
  wherein the PCB comprises an electrical pattern for driving the plurality of light sources on a front side of the PCB on which the plurality of light sources are arranged, and a through hole configured to accommodate the connector, and
  wherein the connector is disposed in the through hole of the PCB such that the connecting part is connected to the front side of the PCB, and the cable is inserted into the inserting part on a rear side of the PCB.

6. The display device of claim 5, wherein the connector comprises a catching protrusion disposed in the inserting part, and wherein the catching protrusion is configured to prevent the cable from departing from the connector.

7. A display device comprising:
  a display panel; and
  a light source module disposed to emit light towards the display panel, the light source module comprising:
    a plurality of light sources comprising:
      a plurality of first lights sources arranged in a plurality of first rows extending in a first direction, wherein sequential first light sources of the plurality of first light sources are separated by first distances in the first direction, and
      a plurality of second light sources arranged in a plurality of second rows extending in the first direction, wherein sequential second light sources of the plurality of second light sources are separated by second distances in the first direction,
  wherein rows of the plurality of first rows are alternately arranged between rows of the plurality of second rows in a second direction;
  a first section in which at least one of the first distances and the second distances are non-uniform; and
  a second section arranged adjacent to the first section in which the first distances and the second distances are uniform,
  wherein first light sources and second light sources arranged on a first edge of the light source module are arranged on a straight line extending in the second direction, and
  wherein the plurality of first light sources and the plurality of second light sources are arranged with an offset in the first direction, and the offset gradually increases in the first direction from the first edge of the light source module toward a second edge of the light source module.

8. The display device of claim 7, wherein the offset increases up to half of a largest distance of the first distances and the second distances in the first section.

9. The display device of claim 7, wherein the first section comprises a plurality of first sections, wherein the plurality of first sections are arranged such that the offset is smallest along opposing edges of the light source module in the first direction.

* * * * *